United States Patent
Keesara et al.

(10) Patent No.: US 10,594,512 B2
(45) Date of Patent: Mar. 17, 2020

(54) ACCESS NETWORK DUAL PATH CONNECTIVITY

(71) Applicant: Extreme Networks, Inc., San Jose, CA (US)

(72) Inventors: Srikanth Keesara, Tewksbury, MA (US); Sakthivadivu Saravanaraj, Nashua, NH (US); Liming Sun, Westford, MA (US); Xiaolan Zhou, Carlisle, MA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 15/801,044

(22) Filed: Nov. 1, 2017

(65) Prior Publication Data

US 2018/0069727 A1    Mar. 8, 2018

Related U.S. Application Data

(63) Continuation of application No. 12/907,535, filed on Oct. 19, 2010, now Pat. No. 9,813,257.

(Continued)

(51) Int. Cl.
*H04L 12/46*    (2006.01)
*H04L 12/26*    (2006.01)
(Continued)

(52) U.S. Cl.
CPC ...... *H04L 12/4633* (2013.01); *H04L 43/0811* (2013.01); *H04L 45/28* (2013.01); *H04L 45/22* (2013.01)

(58) Field of Classification Search
CPC combination set(s) only.
See application file for complete search history.

(56) References Cited

U.S. PATENT DOCUMENTS 7,339,929 B2    3/2008    Zelig et al.
7,345,991 B1    3/2008    Shabtay et al.
(Continued)

FOREIGN PATENT DOCUMENTS

EP            1956766          8/2008
WO    WO-2009/126390 A1    10/2009

OTHER PUBLICATIONS

Drummond, Laurence; Examination Report under Section 18(3); GB Application No. 1115577.7; dated Apr. 11, 2017; Intellectual Property Office; United Kingdom.

(Continued)

*Primary Examiner* — Yee F Lam
(74) *Attorney, Agent, or Firm* — Sterne, Kessler, Goldstein & Fox P.L.L.C.

(57) ABSTRACT

A transport network employs dual homing to an access network to provide connectivity from multiple network switches. Dual homing is a mechanism by which an access network employs pair of switches in the transport network as if it were connecting to a single device. Conventional arrangements for defining multiple paths from a transport network to an access network suffer from the shortcomings of potential routing loops, increased hops to the access network, and inability or inconsistency with forwarding to different types of access networks, and may involve redirecting traffic absent faults in the access network. The dual homed network switches identify the type of access network and perform switching logic corresponding to the access network type to provide comprehensive dual-homed support to the access network independently of the type of transport employed in the access network, and employ redirection only if there is a fault in the access network.

20 Claims, 15 Drawing Sheets

Related U.S. Application Data

(60) Provisional application No. 61/381,678, filed on Sep. 10, 2010.

(51) Int. Cl.
*H04L 12/703* (2013.01)
*H04L 12/707* (2013.01)

(56) References Cited

U.S. PATENT DOCUMENTS

| | | |
|---|---|---|
| 7,411,916 B2 | 8/2008 | Sakov et al. |
| 7,447,151 B2 | 11/2008 | McDysan |
| 7,535,828 B2 | 5/2009 | Raszuk et al. |
| 7,782,841 B2 | 8/2010 | Rampal et al. |
| 7,969,978 B2 | 6/2011 | Napierala |
| 7,995,500 B2 | 8/2011 | Vasseur |
| 8,107,457 B2 | 1/2012 | White et al. |
| 8,125,928 B2 | 2/2012 | Mehta et al. |
| 8,565,230 B2 | 10/2013 | Keesara et al. |
| 2005/0220096 A1* | 10/2005 | Friskney ............ H04L 12/4645 370/389 |
| 2007/0008878 A1 | 1/2007 | Filsfils et al. |
| 2007/0047556 A1 | 3/2007 | Raahemi et al. |
| 2007/0086361 A1* | 4/2007 | Allan .................. H04L 12/462 370/254 |
| 2007/0286069 A1 | 12/2007 | Xu |
| 2008/0008182 A1 | 1/2008 | Deng |
| 2008/0144644 A1 | 6/2008 | Allan et al. |
| 2008/0172497 A1* | 7/2008 | Mohan ............... H04L 12/4616 709/249 |
| 2008/0228943 A1* | 9/2008 | Balus .................. H04L 12/462 709/239 |
| 2008/0291927 A1 | 11/2008 | Yong et al. |
| 2009/0144403 A1* | 6/2009 | Sajassi ............... H04L 12/4625 709/223 |
| 2009/0201803 A1* | 8/2009 | Filsfils ................ H04L 12/185 370/222 |
| 2009/0201937 A1 | 8/2009 | Bragg et al. |
| 2009/0274155 A1 | 11/2009 | Nakash |
| 2010/0103813 A1 | 4/2010 | Allan et al. |
| 2010/0165995 A1 | 7/2010 | Mehta et al. |
| 2010/0226246 A1 | 9/2010 | Proulx |
| 2011/0194404 A1* | 8/2011 | Kluger ............. H04L 12/40189 370/218 |
| 2011/0249552 A1 | 10/2011 | Stokes et al. |
| 2011/0299535 A1 | 12/2011 | Vobbilisetty et al. |
| 2012/0033678 A1* | 2/2012 | Page .................... H04L 45/28 370/401 |
| 2012/0147740 A1 | 6/2012 | Nakash |

OTHER PUBLICATIONS

Drummond, Laurence; Examination Report; UK Application No. GB1115577.7; dated Feb. 11, 2016; Intellectual Property Office; South Wales, United Kingdom.

Davies, Steven; Search Report; UK Application No. GB1115577.7; dated Jan. 9, 2012; Intellectual Property Office; South Wales, United Kingdom.

Office Action dated Dec. 22, 2015 from the German Patent Office, 14 pages.

English Translation of the Office Action dated Dec. 22, 2015 from the German Patent Office, 17 pages.

* cited by examiner

ACCESS NETWORK DUAL PATH CONNECTIVITY

RELATED APPLICATIONS

This application is a continuation application of U.S. patent application Ser. No. 12/907,535, filed Oct. 19, 2010, now allowed, which claims priority to and the benefit of U.S. Provisional Patent Application No. 61/381,678, filed Sep. 10, 2010, entitled "ACCESS NETWORK DUAL PATH CONNECTIVITY," the contents of which are hereby incorporated by reference in their entirety.

BACKGROUND

In a computer network, network switching devices (switches) interconnect to form a path for transmitting information between an originator and a recipient. A routing mechanism, or protocol, defines switching logic that forwards the transmitted information in the form of packets between the switches as a series of "hops" along a path. At each switch, the switching logic identifies the next switch, or hop, in the path using an identifier such as a MAC address. Shortest Path Bridging (SPB) is a routing mechanism having switching logic such that each switch advertises the nodes it knows about to all the other switches, and eventually all the switches in the network have the same picture of the network and therefore can forward frames to the next hop in the shortest path.

SPB is defined in IEEE-802.1aq: IEEE standard for Shortest Path Bridging, and operates in conjunction with IEEE-802.1ah: IEEE standard for Provider Backbone Bridging, sometimes referred to as Mac-in-Mac encapsulation. Both SPB and SPBM forward packets on shortest path trees with minimum path cost as a first order tie-breaker, where for any pair of nodes A and B, the unicast path for A to B is the exact reverse of the path from B to A (reverse path congruency), and all multicast traffic between the two nodes follows the unicast path (multicast and unicast congruency). These are extensions to fundamental Ethernet forwarding properties in IEEE bridged networks.

SPB technology allows a network administrator to easily form mesh networks that distribute load more evenly across the network topology since it can mitigate bottlenecks at core links for traffic that only needs to go from one distribution switch to another. Shortest Path Bridging (SPB, SPBM) technology is being adopted in Ethernet based data networks to enable Layer-2 and Layer-3 network virtualization. These networks are expected to continue to deliver business critical services even when a variety of network faults occur (or when maintenance operations are performed on the network).

SUMMARY

An access network provides connectivity to end stations that provide computing services to users. Typically, an end station communicates with another end station at a remote access network, which may be another user, a server, storage device, or gateway to such entities or services. A transport network provides connectivity and message traffic transport between the access networks. The access network is therefore supporting a number of end users via end stations in a corporate site, local area network, or other campus or enterprise setting. Since an interruption of connection between the access network and transport network may inhibit operation of the access network, and hence all end stations connected to it, it is beneficial to provide an alternate mechanism for throughput from the transport to the access network. Configurations disclosed herein provide multiple connections via a plurality of network devices, such as a network switch, from the transport network to the access network. In an example arrangement shown below, a transport network employs a dual homing arrangement to the access network to provide connectivity from multiple network switches.

Dual homing is a mechanism by which an access network connects to and uses a pair of devices in the transport network as if it were connecting to a single device. The two devices (network switches) in the transport network exchange information between them which allow them to present the access network to the rest of the transport network as if the access network was connected to a single device in the transport network. Failure of the connection of one of the transport devices to the access network or even the complete failure of one of the transport devices will not cause loss of connectivity between the access network and the transport network. The access network therefore exhibits dual homed access, which is an access network that uses dual homing to connect to a pair of transport devices, and the transport devices define a dual homed edge, or a pair of partner devices, in the transport network that provide dual homing service to an access network.

In the examples disclosed herein, the transport network is an SPB network employing EVPN (Ethernet Virtual Private network), an Ethernet bridging service provided by a transport network which connects two or more access networks. The disclosed dual homed access configurations, routing logic and deployment are applicable to other multiple homed schemes for fault tolerance. The bridging service includes the ability to forward data packets from one access network to another using the address information on the packet. A tunnel may be employed across the transport network to connect access networks. Such a tunnel defines a communication path and mechanism used between devices in a transport network—wherein a data packet is encapsulated inside another data packet using header (and trailer) information. A tunnel is identified by the network address of the sender and receiver.

Configurations herein employ a virtual tunnel across the transport network from an originating switch to both of the partner switching devices serving the dual homed access network. Each of the partner switch devices serving the access network are also a dual homed EVPN edge, which is a dual homed edge providing EVPN services, and provides transport to the access network using EVPN dual homing. In the access network, a destination defines an end station, which is equipment that is connected to part of an access network that can send or receive data packets, and may be an interactive user device. In accordance with IEEE-802.1ah, edge devices employed in SPBM networks may be referred to as BEB, as a network device that conforms to the edge device specifications in IEEE-802.1ah and IEEE-802.1aq.

Unfortunately, conventional arrangements for defining multiple paths from a transport network to an access network suffer from the shortcomings of potential routing loops, increased hops to the access network, and inability or inconsistency with forwarding to different types of access networks. Configurations herein are based, in part, on the observation that conventional solutions involve redirecting traffic even when there are no faults in the access network. With the disclosed approach, redirection occurs only if there is a fault in the path to the access network. Conventional approaches do not take advantage of the ability of SPBM to support multiple paths for a given tunnel and do not employ Shared Virtual SPBM tunnels, and may not allow for the interception of traffic addressed to a shared virtual BMAC as the disclosed approach does. In contrast, the disclosed approach reduces traffic latency and also leads to more efficient link utilization by avoiding additional hops to the partner device when both dual homed switching devices are operational.

Accordingly, configurations herein substantially overcome the above described shortcomings by providing a comprehensive solution for dual homed access from an SPBM enabled network for the available types of access networks and transport networks. The disclosed approach provides access to various types of access networks, and avoids restricting access networks to which dual homing can be supported. Various IEEE-standard compliant based access networks may thus be dual homed. Typical conventional arrangements are vendor proprietary or supported only a subset of the standard.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Disclosed below is an example configuration of an SPBM network. In a computer networking environment, dual homing provides multiple (dual) access paths to an access network from a transport network, and thus provides alternate paths for accommodating downtime. Various examples of dual homing configurations and corresponding routing logic are shown; other arrangements will be apparent to those of skill in the art. In the disclosed arrangement, the dual homed switching device may be an Avaya Modular Ethernet Switching product such as the ERS8600, marketed commercially by Avaya Inc., of Basking Ridge, N.J.

A particular feature of fault tolerance in an SPBM network is being able to support dual homing. Dual homing involves connecting an access network to two different edge devices in the transport network and operating the edge devices in the transport network in a manner that ensure that the access network continues to be serviced in the event of either 1) failure of the link(s) from the access network to one of the two edge devices in the transport network, 2) complete failure of one of the two edge devices, or 3) a network maintenance operation that cause ones of the two edge devices to become partially or completely unavailable for an extended interval of time. Achieving these goals requires the disclosed capabilities on the edge devices of a transport network. Features employed to achieve these goals include 1) prevention of data packet duplication, 2) prevention of looping of traffic, which incidentally tend to be extremely debilitating to a network, 3) efficient utilization of the network bandwidth, 4) avoiding unnecessary latency for data traffic, and 5) avoiding restrictions on the type of access networks to which dual homing is supported.

Figure 1:
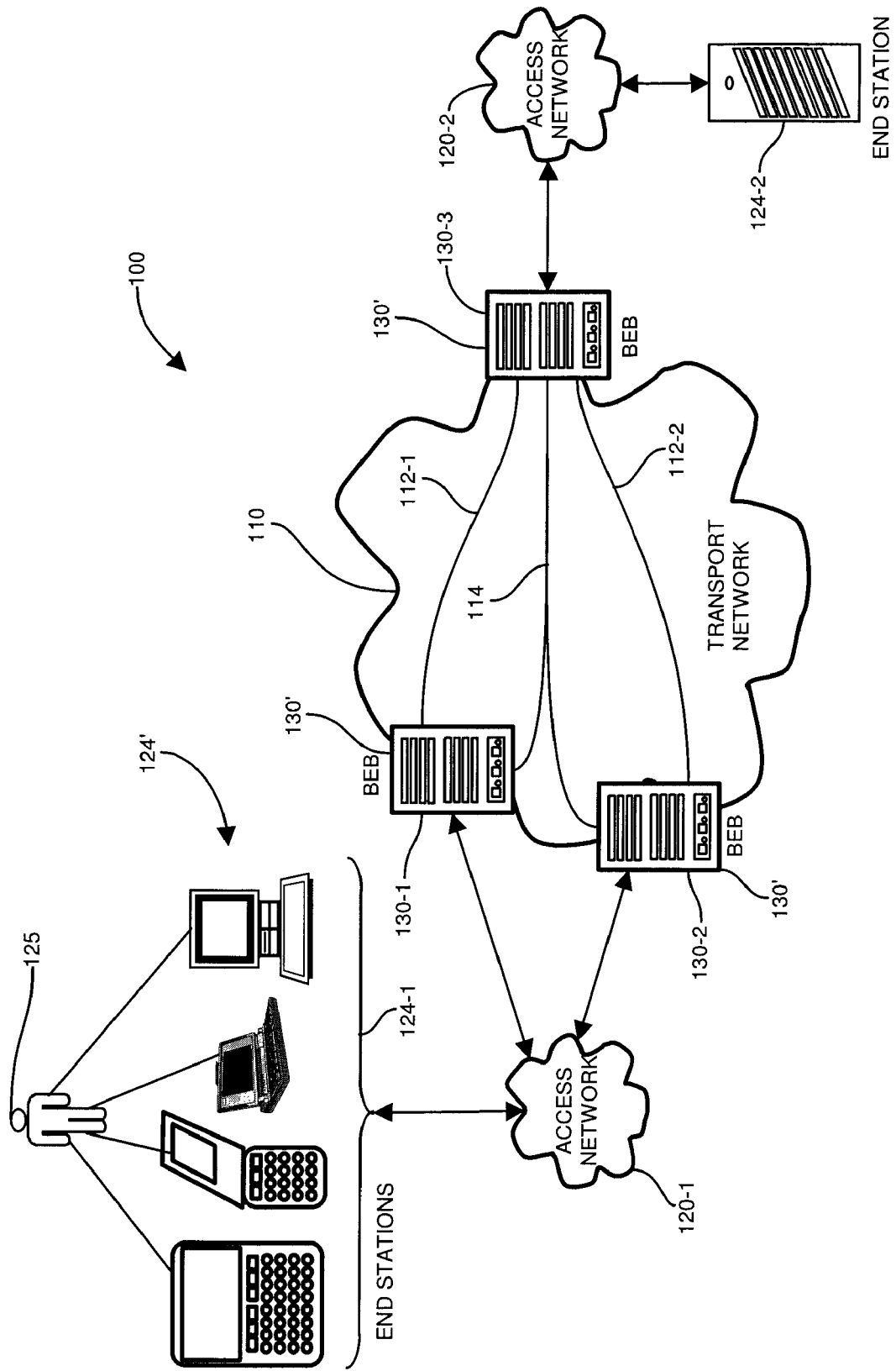
FIG. 1 is a context diagram of a computer networking environment suitable for use with configurations herein.

FIG. 1 is a context diagram of a computer networking environment suitable for use with configurations herein. Referring to FIG. 1, a dual homed network environment 100 includes a transport network 110 and a plurality of access networks 120-1 . . . 120-2 (120 generally), as a network 120 at the edge is typically referred to as an access network. The transport network 110 is therefore an intermediate network connecting two or more separate networks (120-N) at its edge. The access networks 120 couple to end stations 124-1 . . . 124-3 (124 generally) for access by user devices 124' responsive to users 125. The transport network 110 performs transmission of message traffic (packets) between switching devices 130-1 . . . 130-3 (130 generally). Switching devices 130 connected to an access network 120 are edge devices 130', and are designated as an origin or destination across the transport network 110 depending on message traffic direction.

In the example environment 100 shown, the transport network 110 is an SPB/SPBM network according to IEEE-802.1aq, and the access networks 120 may be a Split Multi-Link Trunking (SMLT) network, a spanning tree (STP) network, or other type of access network. Configurations herein identify the type of access network 120 and perform switching logic corresponding to an access network type to provide comprehensive dual-homed support to the access network 120 independently of the type of transport employed in the access network 120.

A Split Multi-Link Trunking (SMLT) access network 120 allows multiple physical network links between two network switches and another device (which could be another switch or a network device such as a server) to be treated as a single logical link and load balance the traffic across the available links. For each packet that needs to be transmitted, one of the physical links is selected based on a load-balancing algorithm (usually involving a hash function operating on the source and destination Media Access Control (MAC) address. A spanning tree (STP/MSTP) network operates according to protocols defined in IEEE-802.1Q for controlling layer-2 networks that use Ethernet bridging. Other types of access networks 120 may be dual homed (i.e. be served by multiple edge devices 130 for redundancy and fault tolerance).

In the example arrangement, employing an SPBM network as the transport network 110, the edge devices 130' are BEBs, which are IEEE-802.1ah/aq compliant edge devices. Edge devices 130-1 and 130-2 provide dual homing to access network 120-1 via links 122-1 and 122-2. In the transport network, a static route 112-1 connects switching device 130-3 to switching device 130-1, and a static route 112-2 connects switching device 130-3 to switching device 130-2. In accordance with dual homing, a virtual link 114 connects switching device 130-3 to both 130-1 and 130-2. The virtual link 114 employs a virtual address that defines separate paths to the access network 120-1 through switching devices 130-1 and 130-2, thus allowing a single routing entry to designate multiple physical paths (through devices 130-1 and 130-2). The virtual address is an address that is used by more than one device in the network as a sender address and is used by more than one device in the network to receive data frames bearing this address as the receiver address Since the same dual homed destination may be traversed by different physical paths, each of the dual-homed pair 130-1, 130-2 are designated as "primary" and "secondary" edge devices, each being a partner of the other. Similarly, routing logic 134 in the origin switch device 130-3 designates a path identifier of either primary or secondary, which denotes the physical path to be followed absent any failures triggering intervention of dual homing. Since the path identifier is independent of the virtual route 114, an individual routing entry is followed by switching device 130-3. If individual path designation is preferred, the routing logic 134 may invoke, i.e. it need not consider which path (through 130-1 or 130-2) be followed.

In the example arrangement, using an SPBM network as a transport network, a. dual homed SMLT edge device refers to the switching device 130 on the dual homed SPBM edge that uses SMLT redundancy to connect to access networks 120 on the edge of the SPBM network 110. A dual homed STP/MSTP edge refers to switching device that uses STP/MSTP redundancy to connect to access networks 120 on the edge of the SPBM network 110. In each of these cases, the switching devices 130-1, 130-2 providing the dual homed access are defines as a primary BEB and s secondary BEB, meaning that the primary BEB in a dual homed SPBM edge that is configured by the operator to be "primary" and the secondary BEB is configured by the operator to be "secondary." A partner BEB is the other of the primary and secondary BEB in a "dual homed SPBM edge."

Figure 2:
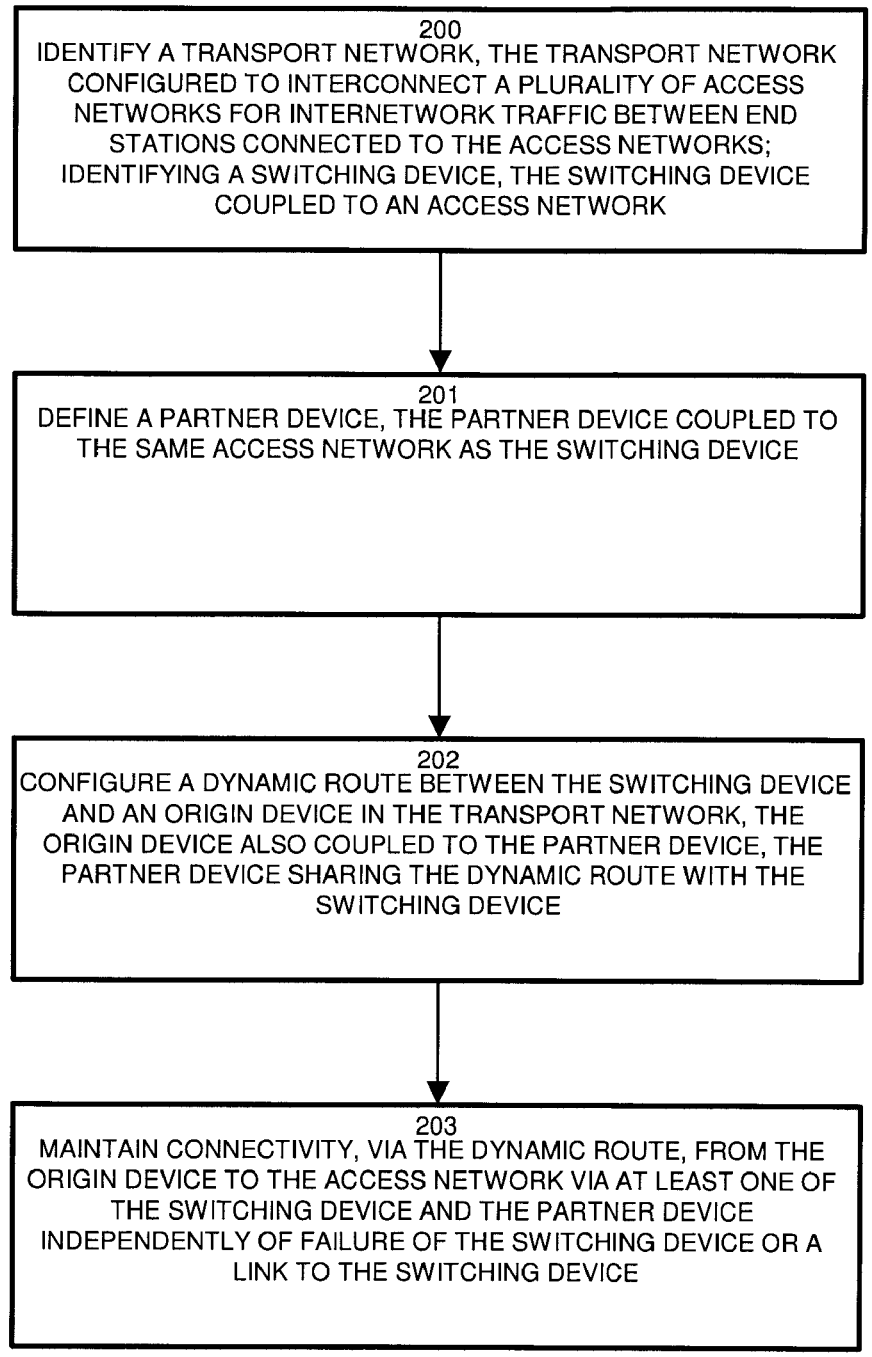
FIG. 2 is a flowchart of network configuration and forwarding in the environment of FIG. 1.

FIG. 2 is a flowchart of network configuration and forwarding in the environment of FIG. 1. Referring to FIGS. 1 and 2, the method of connecting a network switching device between a transport network 110 and an access network 120, the access network 120 for providing connectivity between the transport network 110 and end stations 124 coupled to the access network 120 includes, at step 200, identifying a transport network 110, such that the transport network 110 is configured to interconnect a plurality of access networks 120 for internetwork traffic between end stations 124 connected to the access networks 120, and identifying a switching device 130-1, in which the switching device 130-1 is coupled to the access network 120-1. A configuration defines a partner device 130-2, the partner device 130-2 coupled to the same access network 120-1 as the switching device 130-1, as depicted at step 201. The switching devices 130 configure a dynamic route 114 between the switching devices 130-1, 130-2 and an origin device 130-2 in the transport network 110, such that the origin device 130-3 is also coupled to the partner device 130-2, in which the partner device 130-2 shares the dynamic route 114 with the switching device 130-1, as shown at step 202. The transport network 110 maintains connectivity, via the dynamic route 114, from the origin device 130-3 to the access network 120-1 via at least one of the switching device 130-1 and the partner device 130-2 independently of failure of either the switching device 130-1 or partner device 130-2, or failure of a link to the switching device or partner device.

Figure 3:
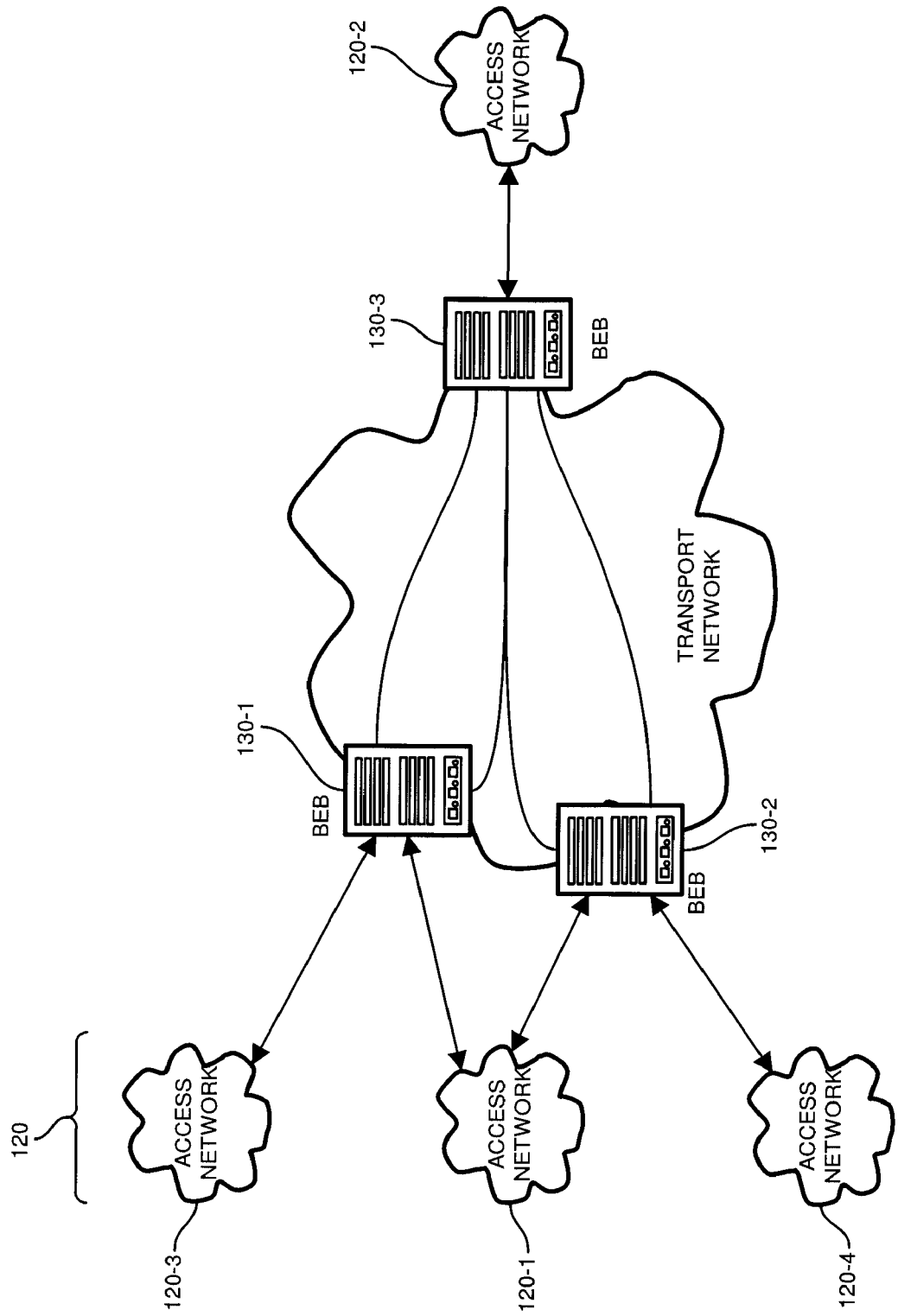
FIG. 3 shows an access network configuration as in FIG. 2 employing single and dual homing.
Figure 4:
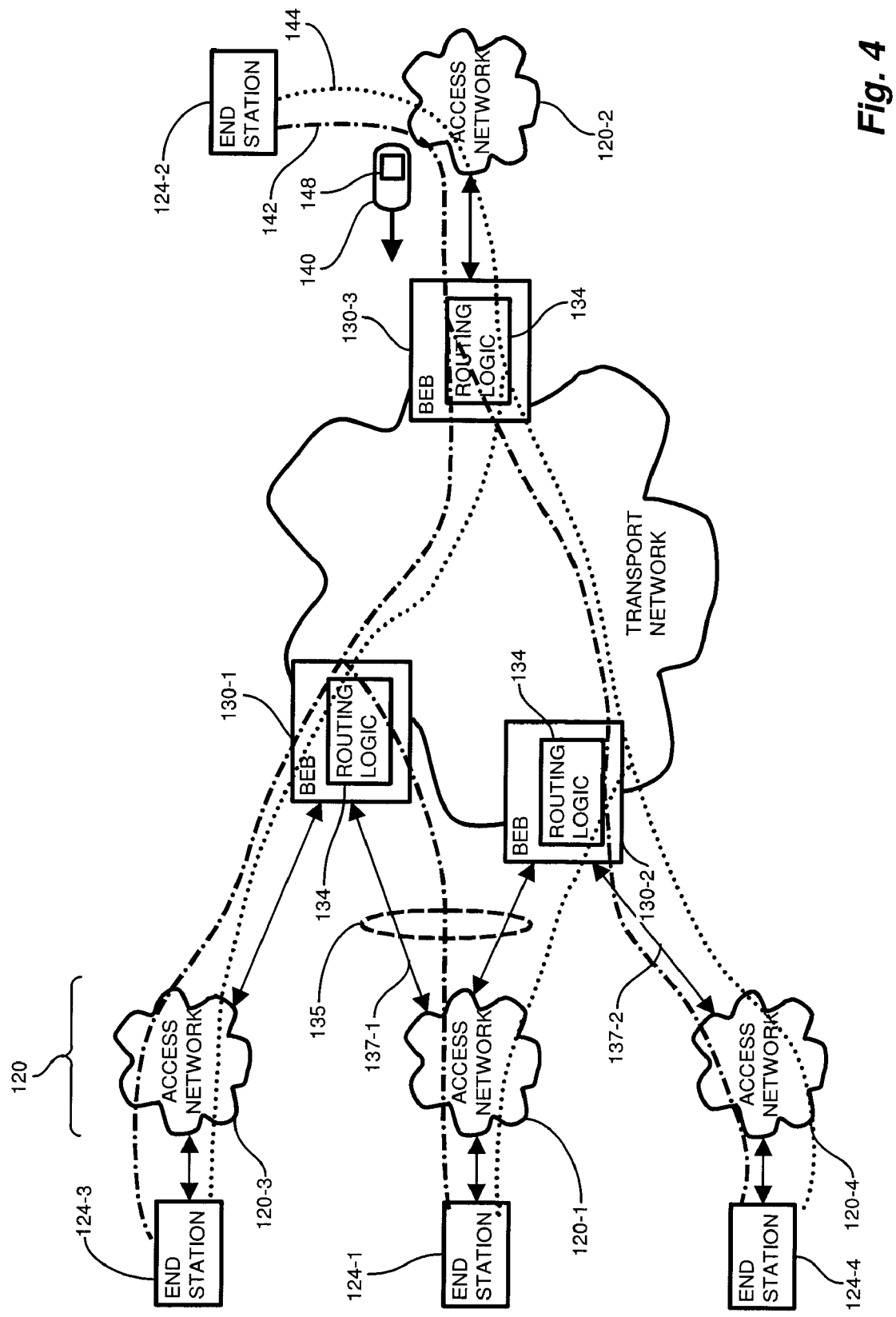
FIG. 4 shows multicast transport in the configuration of FIG. 3.

FIG. 3 shows an access network configuration as in FIG. 2 employing single and dual homing. Referring to FIGS. 3 and 4, each dual homed switching device 130-1, 130-2 may also connect to single homed access networks 120-3, 120-4, serving end stations 124-3 and 124-4, respectively. Routing logic 134 as defined herein likewise servers to provide transport to single homed access networks 121 concurrently to dual homed access to the dual homed access network 120-1.

FIG. 4 shows multicast transport in the configuration of FIG. 3. Referring to FIG. 4, a multicast transmission 140 emanates from end station 124-2. In the example arrangement, each partner pair 130-1 and 130-2 of a dual homed configuration need direct each multicast transmission 140 only once to each dual homed recipient 124-1. The routing logic 134 establishes primary 142 and secondary 144 paths to each of the dual homed switching device pair 130-1, 130-2. Each switching device 130 is configured as the primary 130-1 or secondary 130-2 for the dual homed configuration for a particular access network 120-1. The end station 124-2 sends the multicast transmission 140, and the routing logic determines, from load and flow data, the primary 142 or secondary 144 path. The dual homed arrangement provides a dual homed pair 135 of links 137-1, 137-2 to from the primary and secondary switching devices 130-1, 130-2, respectively, on primary 142 and secondary 144 paths The routing logic 134 writes the determined path (primary or secondary) into a path identifier 148 in the message 140 in addition to the destination address of an end station 124 of the destination access network 120-1. Upon receipt, each of the switching devices 130-1, 130-2 examines the path identifier 148, and the primary switching device 130-1 forwards traffic 140 on the primary path 142, while the secondary switching device 130-2 forwards traffic 140 on the secondary path 144. Multicast traffic 140 to single homed access networks 120-3, 120-4 continues unimpeded via the corresponding single homed access network 120-3, 120-4.

Figure 5:
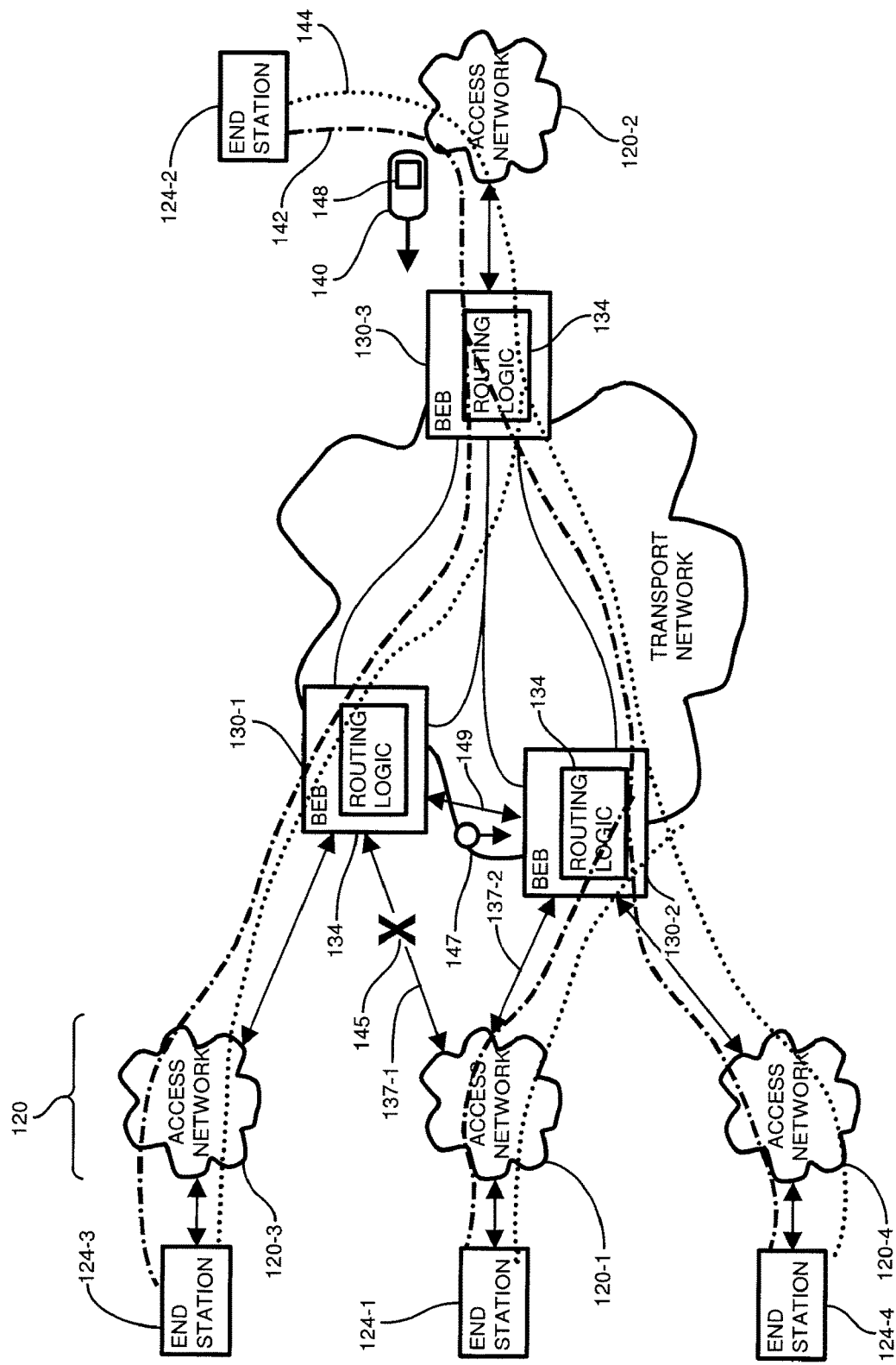
FIG. 5 shows link failure in the configuration of FIG. 4.

FIG. 5 shows link failure in the configuration of FIG. 4. Referring to FIGS. 4 and 5, in the event of failure 145 of one of the dual homed links (137-1 in the example shown), the link 137 to the partner (137-2 in the example) is employed for primary and secondary message traffic 140 to the access network 120-1. A failure notification 147 is received by the functional or unaffected partner as an indication that the partner 137-2 should take over for the primary node and forward all traffic on both the primary and secondary paths 142, 144 to the access network 120. The switching device 130-1 experiencing the failure 145 generates the failure notification 147 from both an intra-device protocol between dual homed partners 130-1, 130-2 and from MAC learning of reachable addresses which indicate unavailable routes, both discussed further below.

Figure 6:
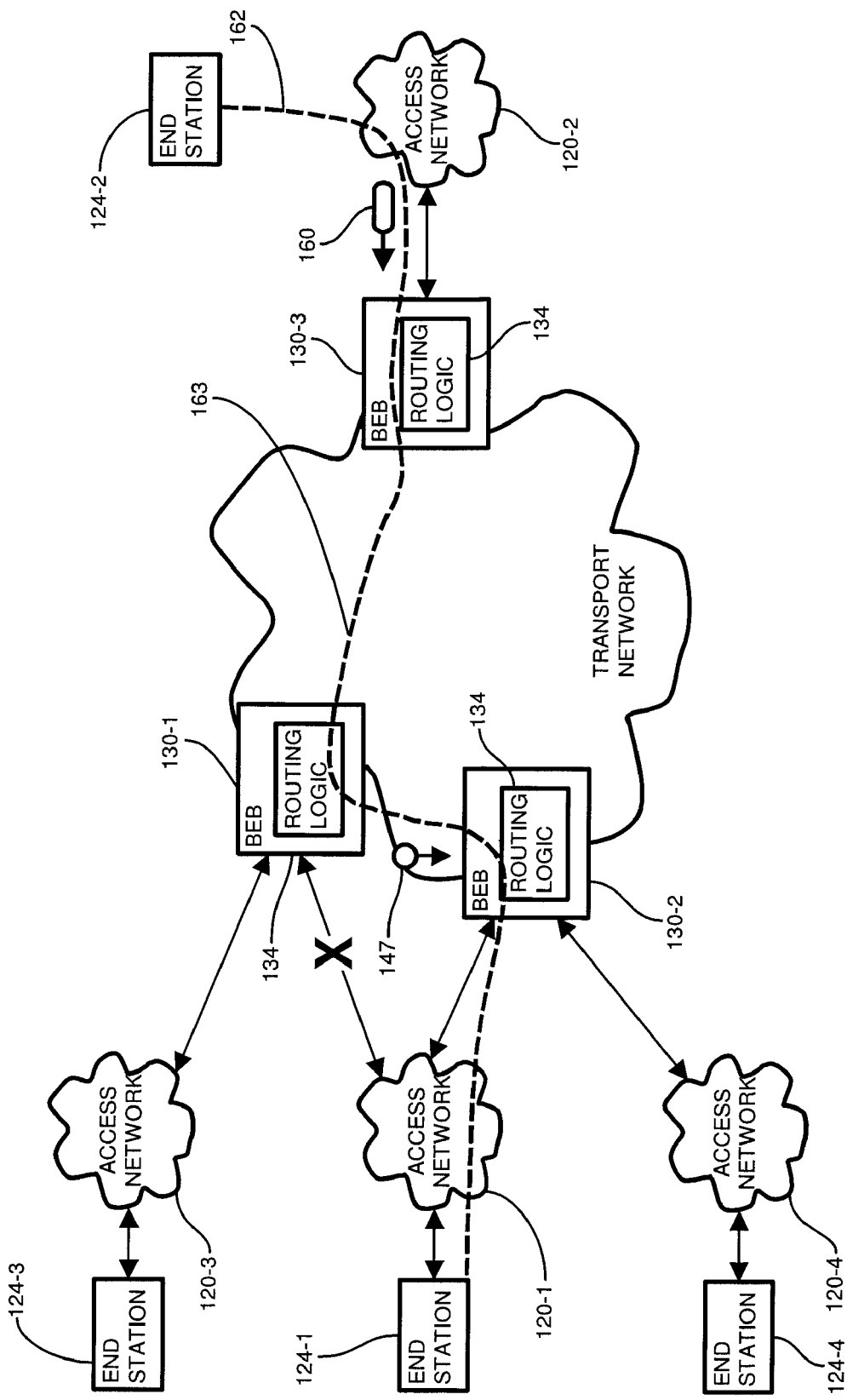
FIG. 6 shows unicast redirection upon a link failure as in FIG. 5.

FIG. 6 shows unicast redirection upon a link failure as in FIG. 5. Referring to FIGS. 4-6, In the multicast example of FIG. 5, both dual homed partners 130-1, 130-2 receive the multicast message on the primary 142 and secondary 144 paths. In contrast, in a unicast transmission, the routing logic 134 selects only one of either the primary 142 or secondary 144 paths for transport to the destination end station 124-1. If the selected path 162 is via the switching device 130-1 experiencing failure, the partner switching device 130-2 has not received the transmission 160. Accordingly, following the failure message 147, the failed partner 130-1 forwards primary path 142 traffic to the partner switching device 130-1 for completion on the secondary path 144, shown as selected path 162.

Figure 7:
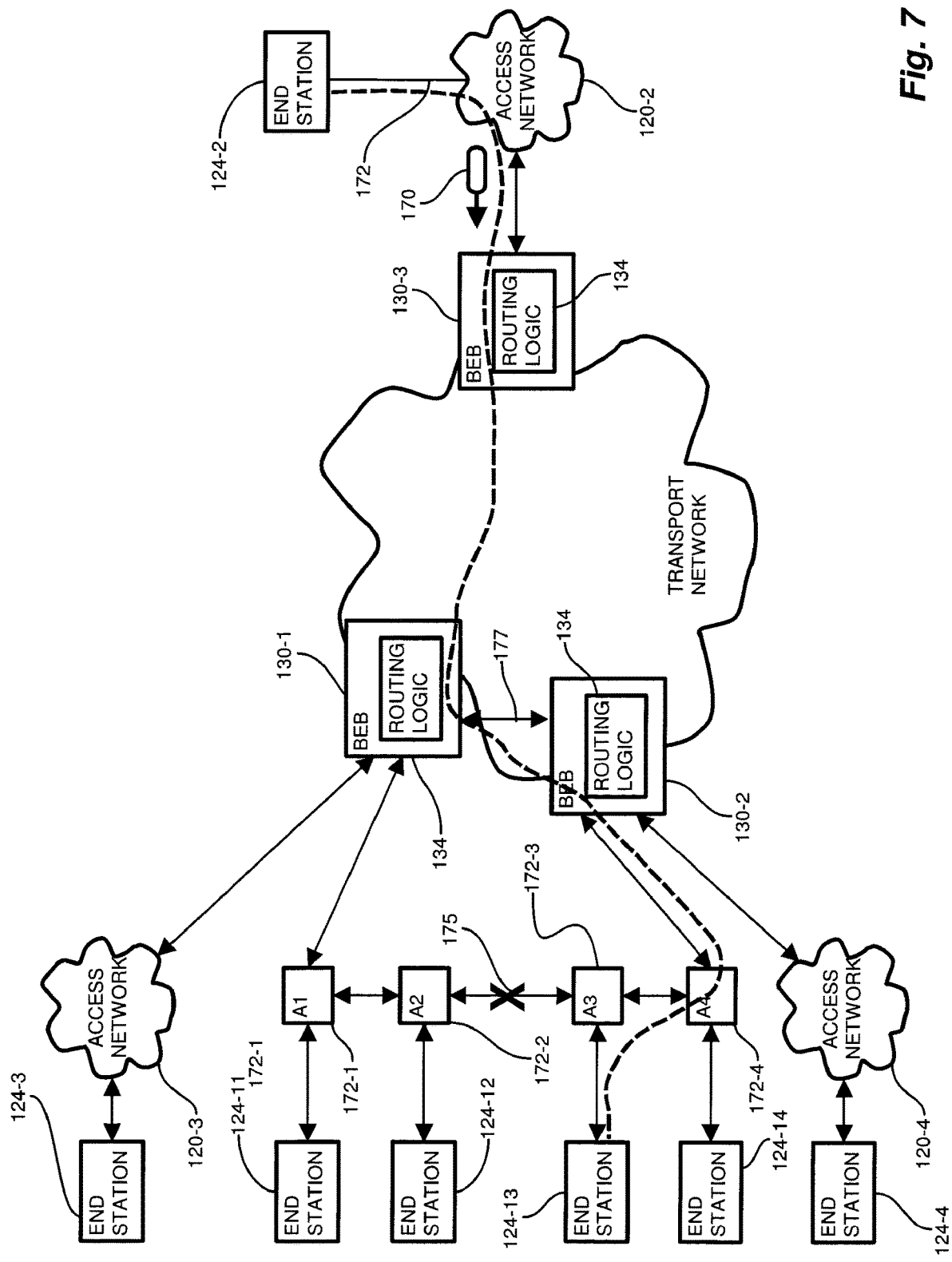
FIG. 7 shows unicast redirection as in FIG. 6 to a spanning tree (STP) access network.

FIG. 7 shows unicast redirection as in FIG. 6 to a spanning tree (STP) access network. Referring to FIGS. 4, and 7, an alternate access network 120 configuration which may be configured for dual homed access is a spanning tree, or STP arrangement. In a dual homed spanning tree configuration, local switching devices 172-1 . . . 172-4 (172 generally) from a serial interconnection over which message traffic 170 passes to a switching device 172-3 serving the destination end station 124-13. In a dual homed spanning tree arrangement, an STP block 175 is implemented along the interconnection to prevent loops back to the dual homed pair 130-1 . . . 130-2. Each dual homed switching device generally maintains switching connectivity for a respective side of the block 175. If the routing logic 134 directs message traffic 170 to the partner switching device 130-1 serving the other side of the block, a BEB interconnection 177 forwards the message traffic 170 to the partner 130-2 for delivery to the end station 124-13.

Figure 8:
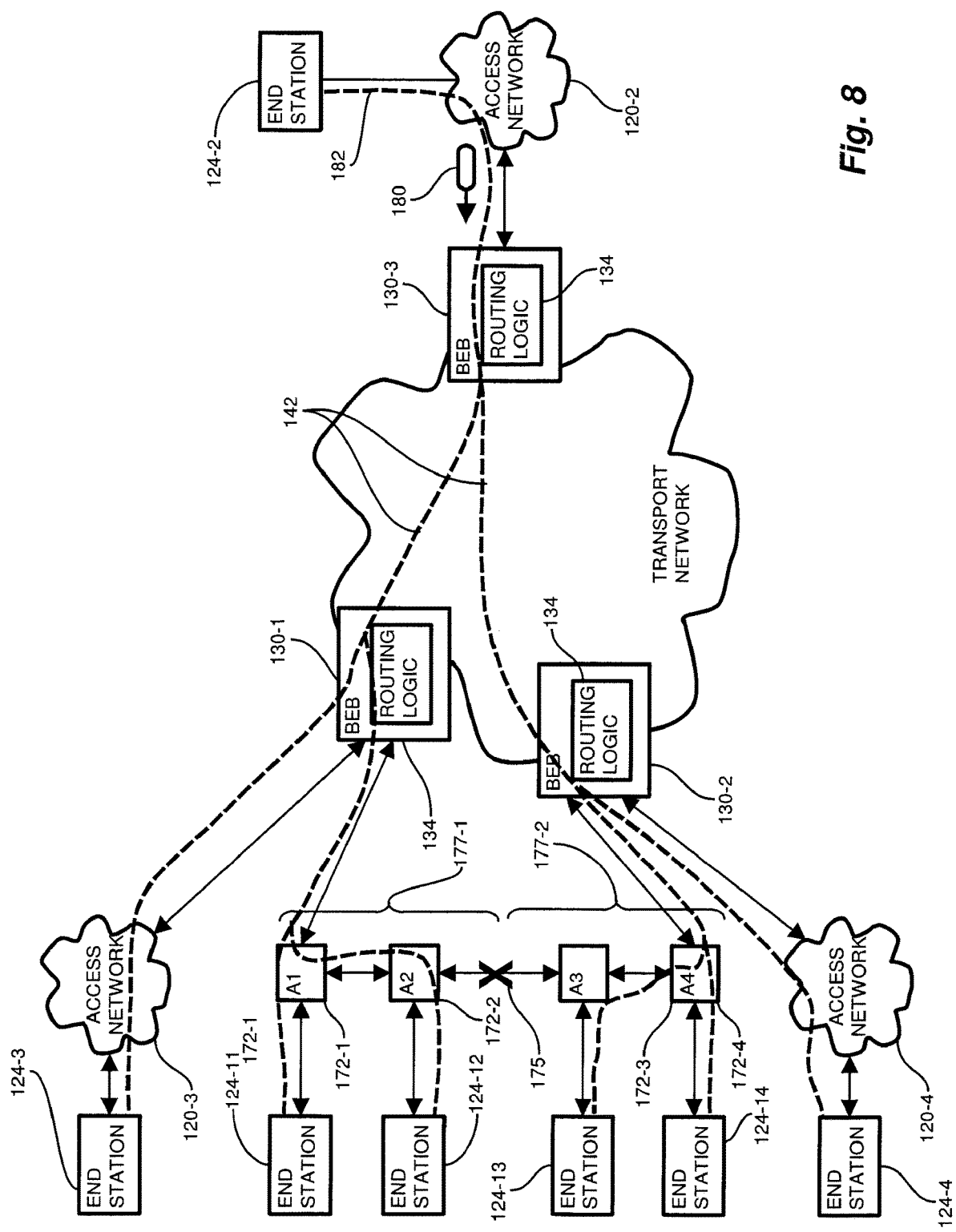
FIG. 8 shows multicast transport to a spanning tree network as in FIG. 6.
Figure 9:
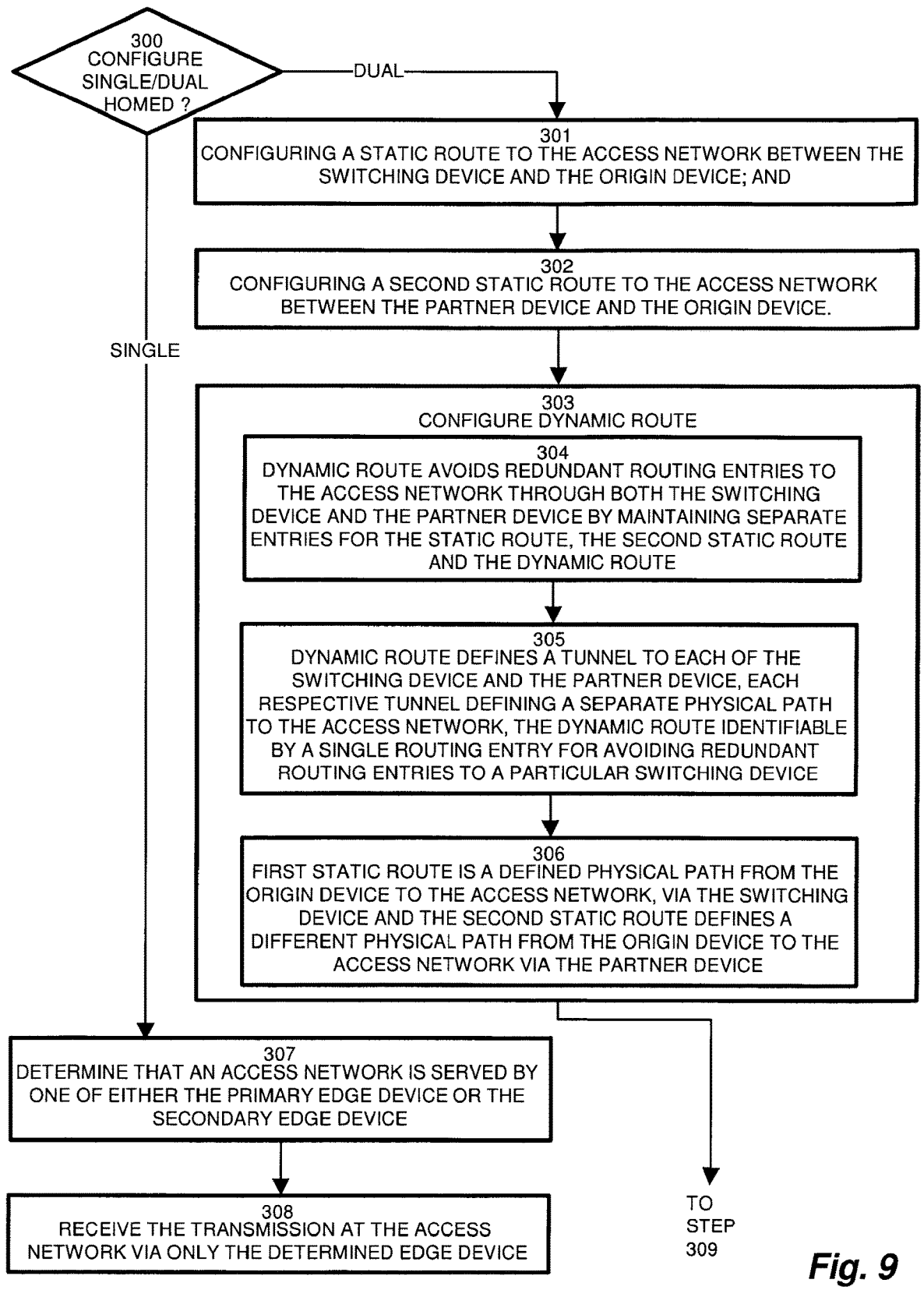
FIGS. 9-15 show a flowchart of network configuration and transport logic disclosed in FIGS. 1-8.
Figure 10:
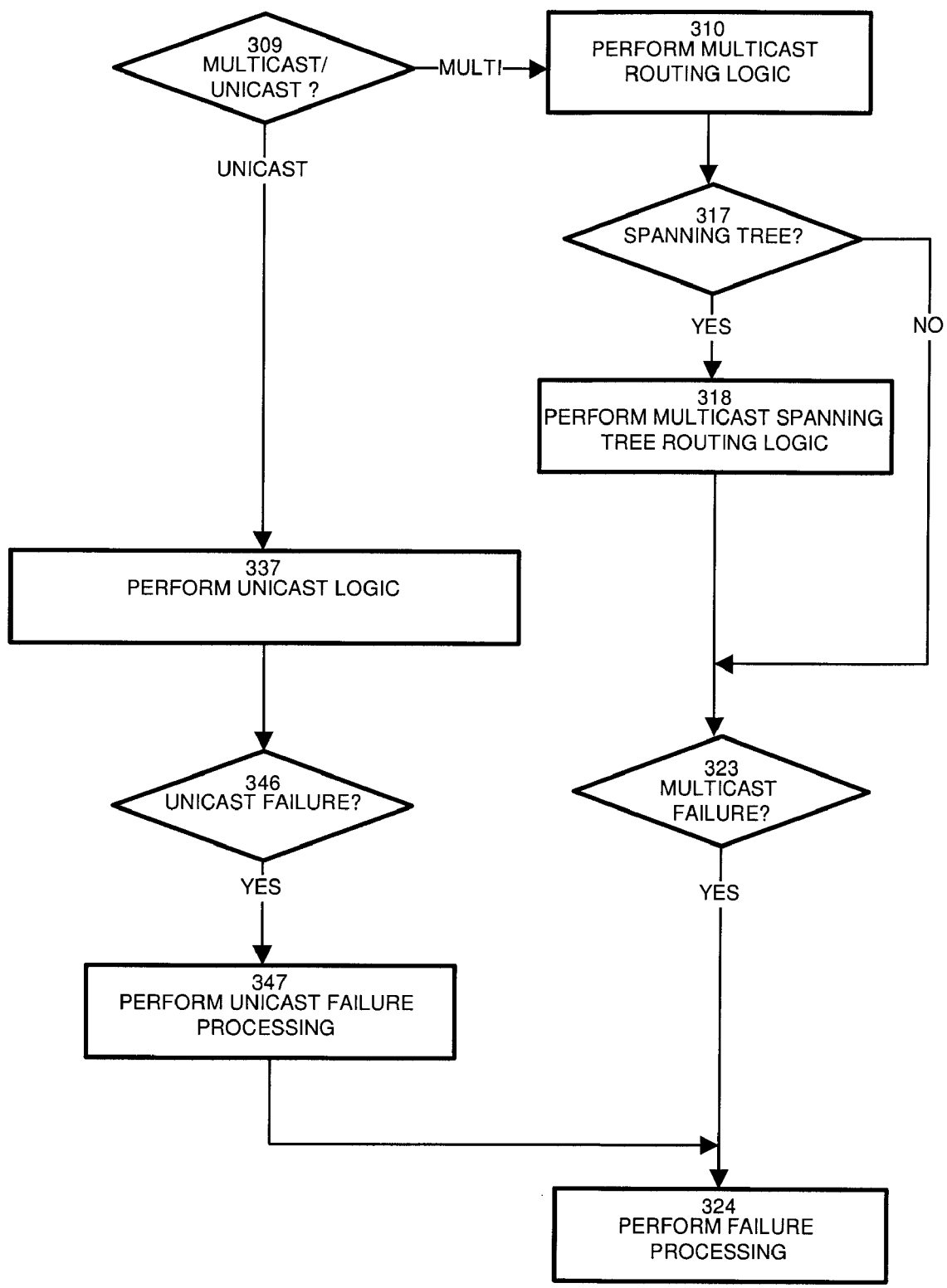
Figure 11:
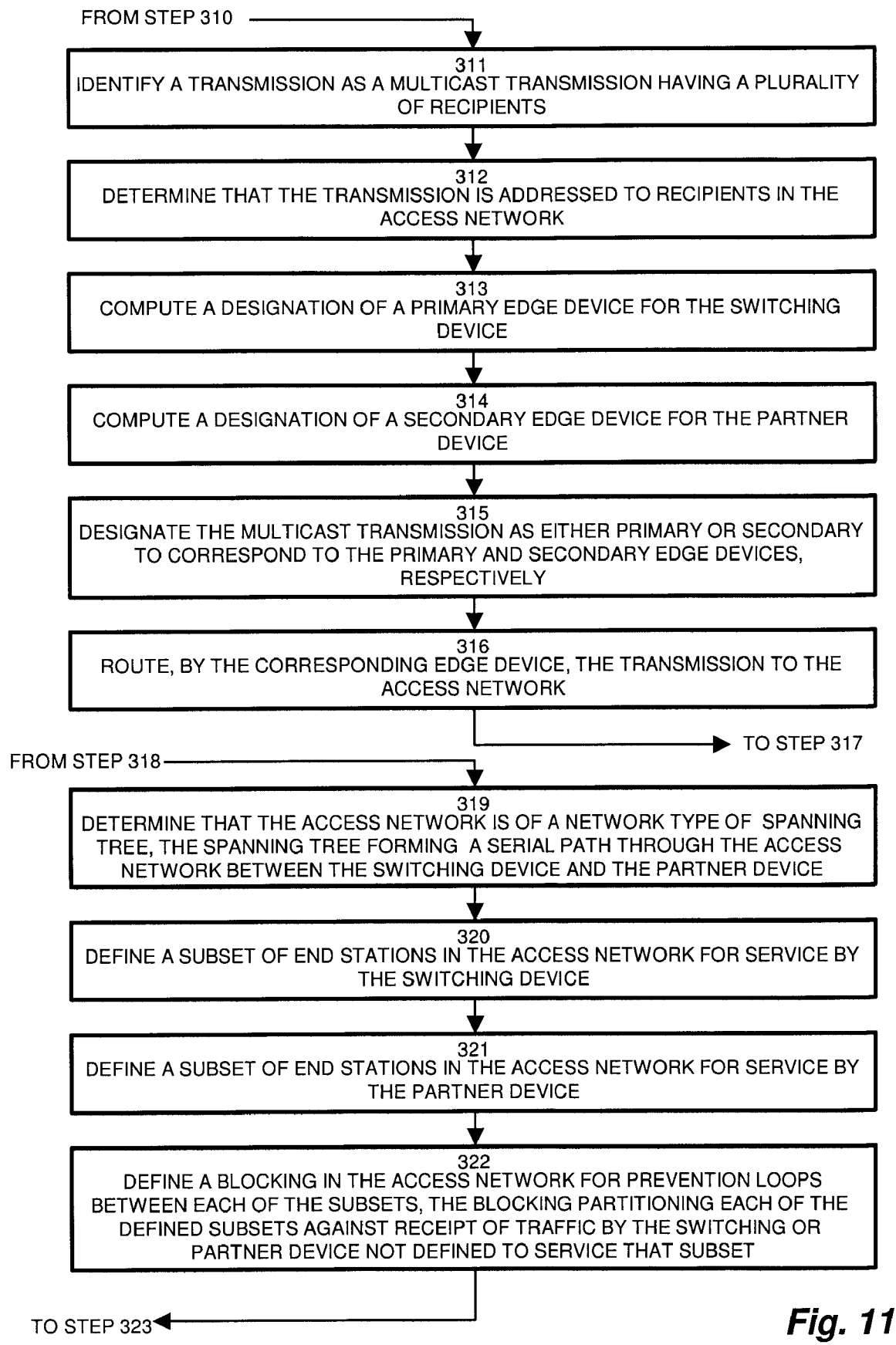
Figure 12:
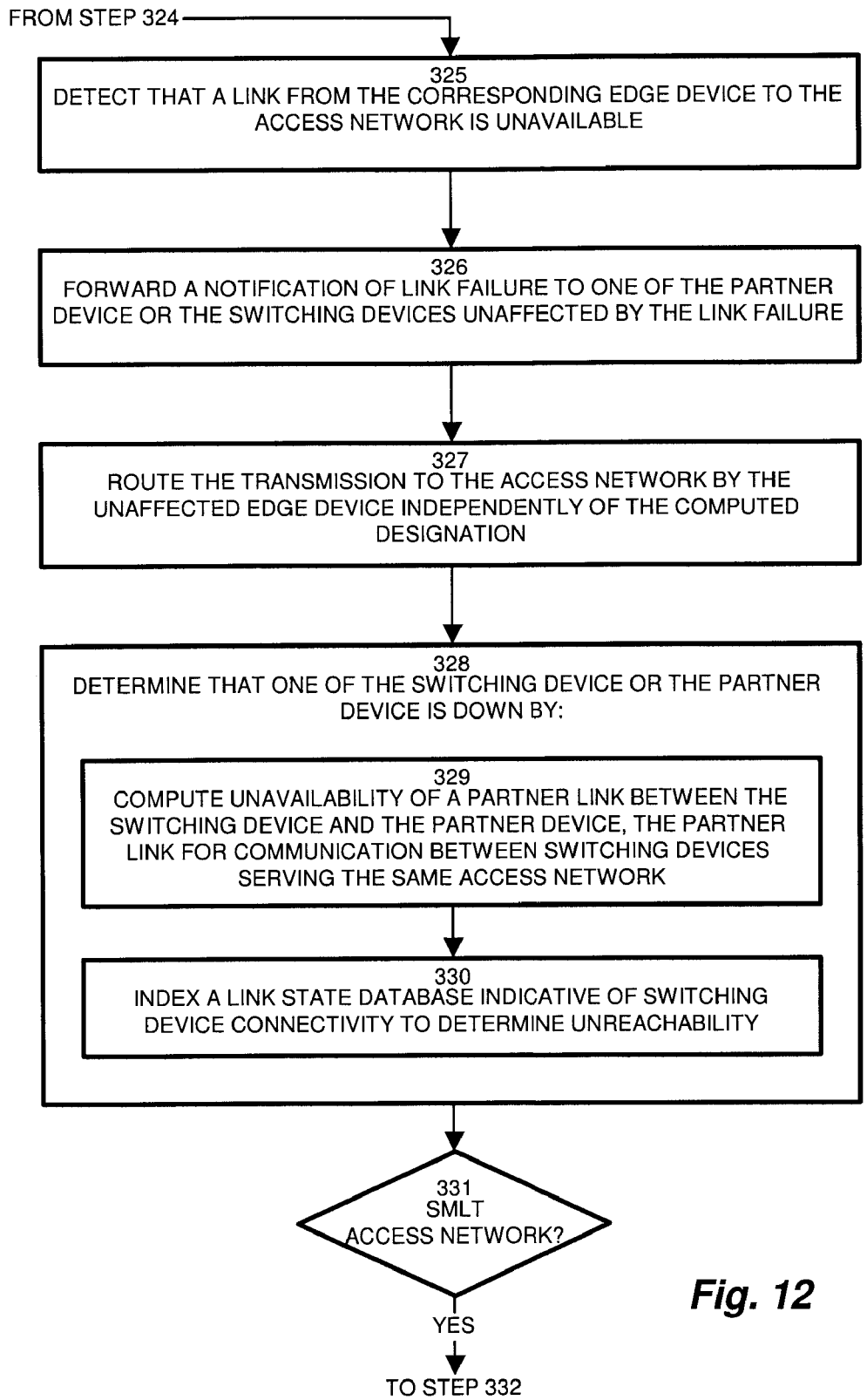
Figure 13:
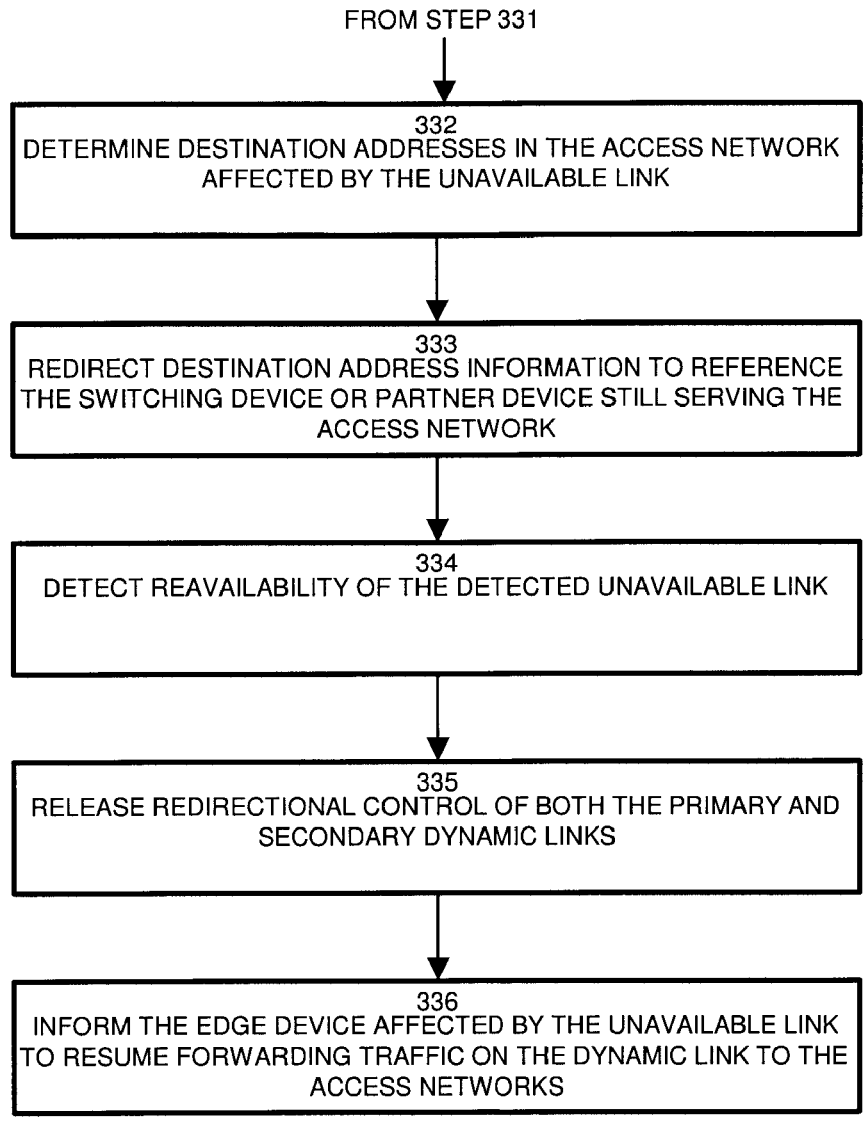
Figure 14:
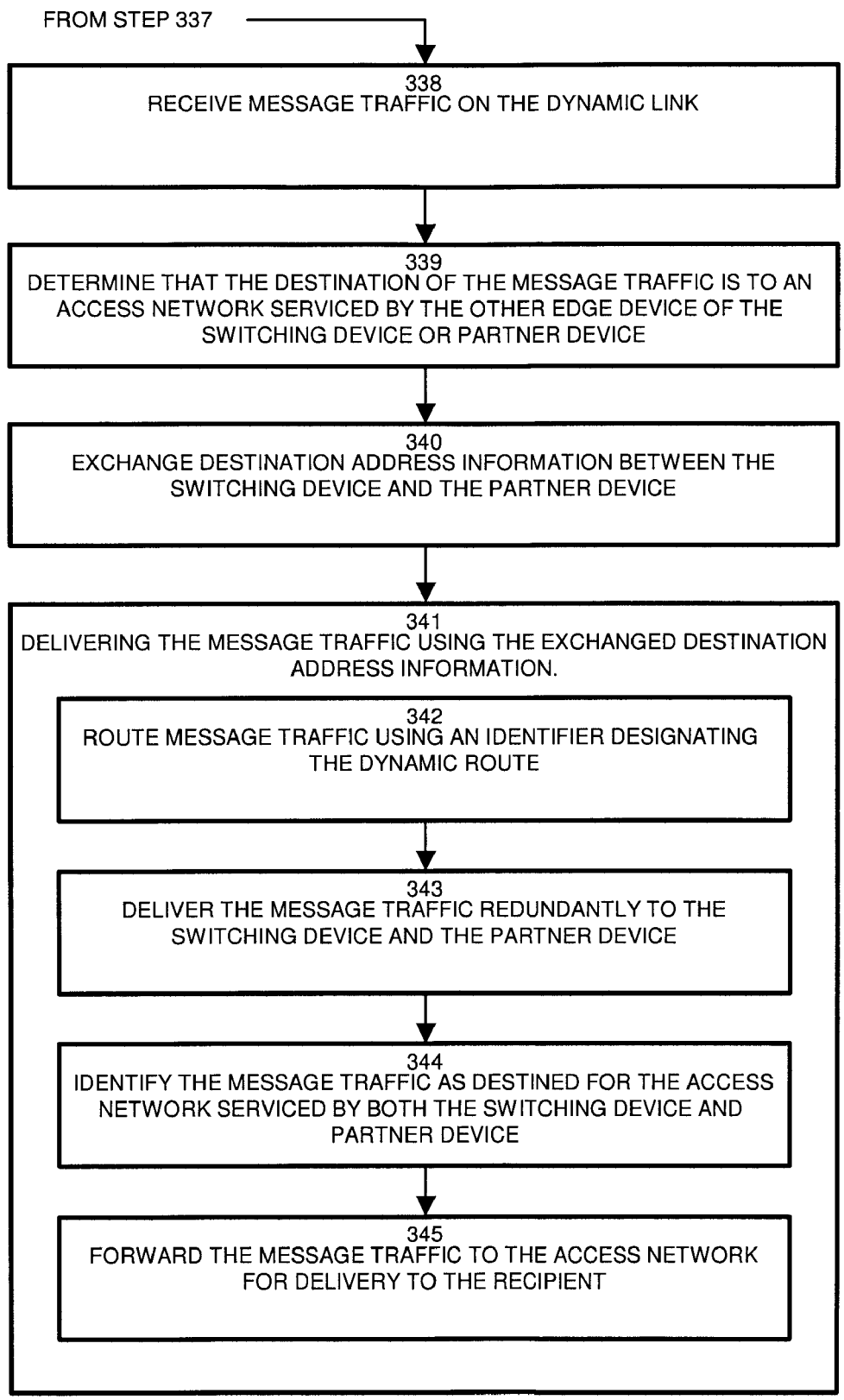
Figure 15:
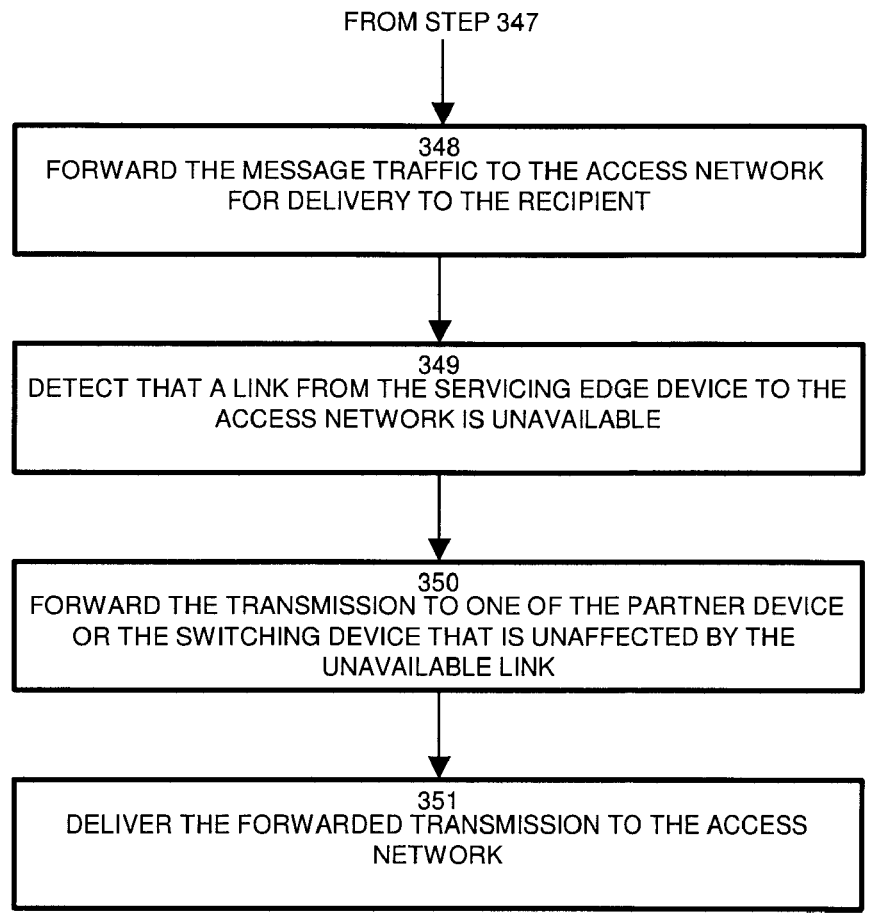

FIG. 8 shows multicast transport to a spanning tree network as in FIG. 6. Referring to FIGS. 4, 6, and 8, multicast message traffic 180 traverses both partner switching devices 130-1, 130-2. Switching logic 134 employs the primary path 142 for transport to each partner 130-1, 130-2 for forwarding to the respective STP portion 177-1, 177-2 on respective sides of the block 175.

FIGS. 9-15 show a flowchart of network configuration and transport logic disclosed in FIGS. 1-8. The transport scenarios depicted in FIGS. 3-8 show a comprehensive routing and forwarding approach by examples of various types of dual homed access networks. FIGS. 9-15 show a sequence of conditions and operations that implement the various examples of FIGS. 3-8. The routing logic 134, incorporated in each switching device 130 serving a single or dual homed switching device 130 implements these transport scenarios, as well as others which will be apparent from the disclosed scenarios.

Referring to FIGS. 9-15, at step 300, configuration logic identifies the access network 120 as single or dual homed. Network configuration includes designating the switching devices 130 serving a dual homed access network 120-1 identifies one of the switching devices as primary and the other as secondary, both being dual homed partners of the other. Dual homed networks, which in the examples shown may be SMLT networks or STP (spanning tree) networks, provide multiple switching devices 130 at the transport network 110 edge (edge devices) to the access network 120. If the access network 120 is dual homed, this includes configuring a static route 112-1 to the access network 120-1 between the switching device 130-2 and the origin device 130-3, as depicted at step 301 and configuring a second static route 112-1 to the access network between the partner device 130-2 and the origin device 130-3, as shown at step 302. A third dynamic 114, or virtual route is configured at step 303 that avoids redundant routing entries to the access network 120-1 through both the switching device 130-1 and the partner device 130-2 by maintaining separate entries for the static route, the second static route and the dynamic route, as shown at step 304. The dynamic route 114 defines a tunnel to each of the switching device 130-1 and the partner device 130-2, in which each respective tunnel defines a separate physical path 112-1, 112-2 to the access network 120, and in which the dynamic route 114 is identifiable by a single routing entry for avoiding redundant routing entries to a particular switching device 130, as depicted at step 305.

The first static route 112-1 is a defined physical path from the origin device 130-3 to the access network 120, via the switching device 130-1 and the second static route 112-2 defines a different physical path from the origin device 124-2 to the access network 120-1 via the partner device 130-2, as shown at step 306 and also in FIG. 1.

In the case of a single homed access network 120-3, 120-4, from step 300, the routing logic 134 determines that the access network (120-3 or 120-4) is served by one of either the primary edge device 130-1 or the secondary edge device 130-2, as depicted at step 307, and receives the transmission at the access network 120-1 via only the determined edge device 130-1, 130-2 as shown at step 308, also shown in FIG. 3. Single homed networks 120-3, 120-4 are deemed to have accepted the risk of reduced fault tolerance present with a single homed configuration, otherwise they would have opted for the dual homed arrangement.

A check is performed, at step 309, to identify the transmission as unicast or multicast. At step 310, In the case of a multicast transmission, control passes to step 311 where the transmission is identified as a multicast transmission 140 having a plurality of recipients. The routing logic 134 at the origin 130-3 determines that the transmission is addressed to recipients in the access network for at least the dual homed access network 120, as shown at step 312. The routing logic 134 or a configuration parameter 148 computes a designation of a primary edge device for the switching device 130-1, as shown at step 313, and computes a designation of a secondary edge device for the partner device 130-2, as shown at step 314. The primary and secondary designations are generally static once applied to a switching device 130 for the dual homed configuration. The switching device 130-3 at the origin designates the multicast transmission 140 as either primary or secondary 148 to correspond to the primary 130-1 and secondary edge devices 130-2, respectively, as shown at step 315, and routes, by the corresponding edge device 130-1, 130-2, the transmission to the access network 120-1. Thus, for a given multicast transmission 140, the primary/secondary designation 148 ensures that the routing logic 134 sends one and only one message instantiation to the access network 120-1, as the partner device will ignore the other (primary/secondary) designation.

The above approach may be illustrated by the following rules, which are used to prevent packet duplication and looping of multicast traffic. 1. Multicast traffic 140 in the SPBM core 110 using the primary BVLAN 142 is forwarded to a dual homed SMLT access network 120-1 by the primary BEB 130-1. 2. Multicast traffic in the SPBM core 110 using the secondary BVLAN 144 is forwarded to dual homed SMLT access network 120-1 by the secondary BEB 130-2. Further, a single homed access network 120-3, 120-3 can receive both primary 142 and secondary BVLAN 144 multicast traffic 140 from whichever BEB 130-1, 130-2 that it connects to, also shown in FIG. 4.

A check is performed, at step 317 for a spanning tree access network, and if, at step 318, the access network 120-1 is a spanning tree (STP) network, then control passes to step 319, where the routing logic 134 determines that the access network 120-1 is of a network type of spanning tree, such that the spanning tree forms a serial path 172-1 . . . 172-4 through the access network between the switching device 130-1 and the partner device 130-2, also shown in FIG. 8. The routing logic 134 defines a subset of end stations 124 in the access network for service by the switching devices 130-1, 130-2, as depicted at step 320. For each switching device 130, the routing logic defining a subset 177-1, 177-2 of end stations 124 in the access network for service by each of the partner devices 130-1, 130-2, as shown at step 321 and defines a blocking 175 in the access network for prevention loops between each of the subsets 177, such that the blocking 175 partitions each of the defined subsets 177 against receipt of traffic by the switching 130-1 or partner 130-2 device not defined to service that subset 177, as disclosed at step 322.

The corresponding rule in the routing logic therefore suggests that a dual homed STP/MSTP based access network 172-1 . . . 172-4 can receive both primary and secondary BVLAN 142 multicast traffic 180 from both the BEBs 130-1, 130-2 that it connects to, and relies on the port blocking 175 in the access network 172 to prevent network loops.

A feature of the dual homed approach is fault tolerance in the event of failure of one of the partner devices 130-1, 130-2. At step 323, in the event of failure, control passes to step 324. The routing logic 134 detects that a link 137-1 from the corresponding edge device 130-1 to the access network 120-1 is unavailable, as disclosed at step 325. The affected switching device 130 forwards a notification 147 of link failure to one of the partner device 130-2 or the switching device 130-1 unaffected by the link failure 145, as shown at step 326. The routing logic 134 directs routing of the transmission to the access network 120-1 by the unaffected edge device 130 independently of the computed designation 148 of primary/secondary, as depicted at step 327. Thus, in the case of failure of one of the dual-homed switching devices 130-1,130-2, the other partner forwards all multicast traffic for both the primary 142 and secondary 144 paths. The routing logic 134 therefore implements the rule that a given dual homed SMLT access network 120-1 receives primary BVLAN 142 multicast traffic 140 from the secondary BEB 130-2 if and only if the link(s) 137-1 that connect the access network 120-1 to the primary BEB 130-1 are all down. Further, the complementary rule provides that a given dual homed SMLT access network 120-1 receives secondary BVLAN 144 multicast traffic 140 from the primary BEB 130-1 if and only if—the link(s) 137-2 that connect the access network 120-1 to the secondary BEB 130-2 are all down, also shown in FIGS. 4 and 5.

Link 137 failure detection further includes, at step 328, determining that one of the switching device 130-1 or the partner device 130-2 is down. The routing logic 134 computes unavailability of a partner link 149 between the switching device 130-1 and the partner device 130-2, as depicted at step 329, in which the partner link 149 is for communication between switching devices 130 serving the same access network 120-1 for such messages as the unavailability notification 147. The routing logic also indexes a link state database indicative of switching device 130 connectivity to determine unreachability, as depicted at step 330. The link state database may be provided by routing topology information commonly propagated among switching devices.

The routing logic 134 implements a rule for determination of a partner BEB down. The partner link 177 for communicating between two network deices 130-1, 130-2 that are peers in a "Dual homed edge" is maintained by a specialized protocol. The link 137 propagation is addressed by ISIS, A networking protocol defined by an ISO standard, and is a typical protocol for implementations of IEEE-802.1aq as disclosed herein. Such links employ an ISIS System-Id, which is a unique identifier used by each network device within a network device that uses ISIS. Unavailability is based on whether the following criteria is met—the primary 130-1 (and/or secondary 130-2) BEB determines that it has lost all connectivity with its partner by 1. The partner link 149 between the two BEBs 130 is down and 2. ISIS has determined that it has lost reachability to the partner. 130 This is possible because the Partner ISIS System-Id is configured on the local device and it can monitor reachability to that System-Id. Losing all connectivity with the partner means that 1. Either the SPBM core 110 has segmented with the primary 130-1 and secondary BEBs 130-2 ending up in different segments or 2. The partner is down.

A check is performed, at step 331, to identify an SMLT access network 120-1. If so, then the routing logic 134 determines destination addresses for end stations 124 in the access network 120-1 affected by the unavailable link 137-1, as disclosed at step 332, and redirects destination address information to reference the switching device 130-2 or partner device still serving the access network 120-1, as shown at step 333.

The routing rules for redirecting unicast traffic using a SPBM tunnel in the partner link 177 are as follows: If a dual homed SMLT access network loses its link(s) to either the primary 130-1 or the secondary BEB 130-2, the EVPN MAC addresses that have been learnt from that access network are reprogrammed to point to the SPBM tunnel 177 between the primary 130-1 and the secondary BEB 130-2. This will allow traffic arriving from the SPBM core 110 at the BEB 130-1 to be redirected to the partner 130-2 in event of the failure of link(s) 137-1 between the BEB 130-1 and a dual homed SMLT access network, also shown in FIG. 6.

When the unavailability condition of the link 137 no longer exists, the unaffected switching device 130-2 detects reavailability of the detected unavailable link 137-1, as shown at step 334, and releasing redirectional control of both the primary and secondary dynamic links 142, 144, as depicted at step 335. The routing logic 134 informs the edge device 130-1 affected by the unavailable link 137-1 to resume forwarding traffic on the dynamic link 142 to the access network 120-1, as shown at step 336. The routing logic 134 for determination of Partner BEB UP includes the following rules: a primary or secondary BEB determines that its partner is UP if at least one of the following conditions is met. 1. The control channel link 177 (IST) between the two BEBs is up OR 2. ISIS has determined that it has reachability to the partner. This is possible because the Partner ISIS System-Id is configured on the local device and it can monitor reachability to that System-Id.

Following determination of partner switching device 130 availability, the routing logic 134 implements the following rule releasing the Shared Virtual BMAC for the partner BVLAN 142, 144 so that primary 142 and secondary 144 paths will again be intercepted by their respective switching devices 130-1, 130-2. A primary BEB release its control of the Shared Virtual BMAC on the secondary BVLAN 144 after it determines that the secondary BEB 130-2 is UP. A secondary BEB 130-2 releases its control of the Shared Virtual BMAC on the primary BVLAN 142 after it determines that the primary BEB 130-1 is UP.

In the case of dual homed spanning tree unicast traffic, at step 337, the switching device 130-1 receives message traffic 170 on the dynamic link 114, as depicted at step 338, also shown in FIG. 7. The routing logic 134 determines that the destination of the message traffic 170 is to an access network 172 serviced by the other edge device 130-2 of the switching device 130-1 or partner device 130-2, as shown at step 339. Each device 130 exchanges destination address information between the switching device 130-1 and the partner device 130-2 using link 177, as disclosed at step 340, and delivers the message traffic 170 using the exchanged destination address information, as depicted at step 341. Routing rules include, for dual homed access networks that use STP or MSTP (instead of SMLT) for redundancy, topology changes in the access network may cause MAC addresses to move from the primary BEB side of a STP/MSTP blocked link 175 to the secondary side or vice-versa. Since all data traffic from a dual homed access network (SMLT based or STP/MSTP based) uses the Shared Virtual BMAC based tunnels 142, 144—the knowledge of the change in access topology is localized. Since the two BEBs 130-1, 130-2 exchange their EVPN MAC tables using the control protocol, they are able to redirect the unicast traffic 170 from the core 110 to the correct BEB 130-1, 130-2 even if it arrives at the BEB and finds that CMAC is learnt by the partner BEB 130-N on the other side of a blocked STP/MSTP link 175 in the access network.

Unicast spanning tree forwarding further includes routing message traffic 170 using an identifier designating the dynamic route 142, as depicted at step 342, and delivering the message traffic 170 redundantly to the switching device 130-1 and the partner device 130-2 via the virtual link 114, as shown at step 343. Each switching device 130-1, 130-2 identifies the message traffic as destined for the access network serviced by both the switching device 130-2 and partner device 130-2, as disclosed at step 344, and forwards the message traffic to the access network 120-2 for delivery to the recipient at a corresponding end station 124, as disclosed at step 345. As indicated above, forwarding on the dynamic path 142 includes appending the path identifier 148 to the massage header, the path identifier indicative of either the primary or secondary edge devices, such that the virtual tunnel 114 is agnostic to the path identifier 148.

The routing logic 134 implements a rule directed to intercepting unicast traffic Addressed to Virtual BMAC 142: The primary BEB 130-1 can intercept secondary BVLAN traffic destined for the Virtual BMAC 142 and forward it towards the dual homed access network 120-1. Similarly, the secondary BEB 130-2 can intercept primary BVLAN traffic destined for the Virtual BMAC 144 and forward it towards the dual homed access network 120-1. This works because in the case of layer-2 bridged data traffic because the Virtual BMAC is only used for traffic that has to be sent towards dual homed access network(s) and by definition both the BEBs are connected to the dual homed access network(s).

This approach works for unicast traffic in the case of traffic routed into an ISID because it is only done if the underlying VLAN is configured for active-active Router Redundancy (a.k.a. RSMLT) on the primary 130-1 and secondary BEB 130-2 pair. In this case both the BEBs are capable of routing the traffic addressed to the other router. This interception of traffic using the Virtual BMAC leads to lower latencies and more efficient link utilization in the SPBM core—because the traffic travels on one less core link before it is sent to the access network 120-1.

At step 348, In the case of unicast failure, the routing logic 134 attempts to forward the message traffic 160 to the access network 120-1 for delivery to the recipient. The available switching device 130-1, 130-2 detects that a link 137-1 from the servicing edge device 130 to the access network 120-1 is unavailable, as disclosed at step 349. The partner link 177 forwards the transmission to one of the partner device 130-2 or the switching device 130-1 that is unaffected by the unavailable link 137-1, as shown at step 350, and delivers the forwarded transmission to the access network 120-1, as depicted at step 351. The link failure notification and reavailability notification is similar to that of the multicast, and thus control reverts to step 324.

The corresponding routing rule may be stated as follows: after a primary BEB 130-1 determines that it has lost all connectivity to its partner 130-2, it takes over the Shared Virtual BMAC path 144 that uses the secondary BVLAN. Now the primary BEB owns both paths of the shared Virtual BMAC 142. The primary BEB 130-1 also starts forwarding both primary and secondary BVLAN multicast traffic to all of its dual homed access networks 120.

Those skilled in the art should readily appreciate that the programs and methods for connecting a network switching device between a transport network and an access network as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of connecting a network switching device between a transport network and an access network has been particularly shown and described with references to embodiments thereof, it will be understood by those skilled in the art that various changes in form and details may be made therein without departing from the scope of the invention encompassed by the appended claims.

What is claimed is:

1. A method for transporting data frames using a virtual tunnel, the method comprising:
   maintaining connectivity between a first access network and a second access network over a dynamic route, using (i) an origin device coupled to the first access network and (ii) a primary edge device and a secondary edge device both coupled to the second access network, wherein the dynamic route comprises a shared virtual tunnel across a transport network from the origin device to both of the primary edge device and the secondary edge device;
   in response to receiving a notification of failure of a first respective link from an affected one of the primary edge device or the secondary edge device, routing a multicast transmission to the second access network by an unaffected one of the primary edge device or the secondary edge device via a second respective link, independently of a multicast transmission designation;
   identifying a second transmission as a unicast transmission having a recipient in the second access network;
   designating the unicast transmission, by the origin device, to correspond to either the primary edge device or the secondary edge device;
   subsequent to the receiving the notification of failure of the first respective link at the unaffected one of the primary edge device or the secondary edge device, receiving the unicast transmission from the affected one of the primary edge device or the secondary edge device, wherein the unaffected one of the primary edge device or the secondary edge device was not designated by the unicast transmission designation; and
   transmitting the unicast transmission, by the unaffected one of the primary edge device or the secondary edge device, to the second access network via the second respective link.

2. The method of claim 1, further comprising:
   configuring a first static route between the primary edge device and the origin device, and a second static route between the secondary edge device and the origin device; and
   configuring the dynamic route using the first static route and the second static route.

3. The method of claim 2, wherein the primary edge device and the secondary edge device maintain a separate routing entry for each of the first static route, the second static route, and the dynamic route.

4. The method of claim 1, further comprising:
   receiving a second multicast transmission having a plurality of recipients in the second access network; and
   designating the second multicast transmission, by the origin device, to correspond to the primary edge device or to the secondary edge device,
   wherein the second multicast transmission is routed over the dynamic route to the second access network based on the second multicast transmission designation.

5. The method of claim 4, further comprising:
   detecting that the first respective link from either the primary edge device or the secondary edge device to the second access network is unavailable; and
   forwarding a notification of failure of the first respective link to an unaffected one of the primary edge device or the secondary edge device whose second respective link to the second access network is still available.

6. The method of claim 1, further comprising determining that one of the primary edge device or the secondary edge device is down by the other one of the primary edge device or the secondary edge device by:
   computing unavailability of a partner link between the primary edge device and the secondary edge device, the partner link for communication between the primary edge device and the secondary edge device serving the second access network; or
   indexing a link state database indicative of switching device connectivity to determine unreachability of the primary edge device or the secondary edge device.

7. The method of claim 1, further comprising:
   determining, by the unaffected one of the primary edge device or the secondary edge device, an availability of the first respective link that previously failed; and
   releasing redirectional control of traffic for the affected one of the primary edge device or the secondary edge device.

8. The method of claim 7, further comprising:
   identifying a second unicast transmission having a recipient in the second access network;
   using an identifier designating the dynamic route;
   transmitting the second unicast transmission redundantly to the primary edge device and the secondary edge device; and
   delivering the second unicast transmission to the second access network based at least on a path header indicating either the primary edge device or the secondary edge device.

9. A system for transporting data frames using a virtual tunnel, the system comprising:
   communications circuitry; and
   control circuitry configured to:
      maintain connectivity between a first access network and a second access network over a dynamic route, using (i) an origin device coupled to the first access network and (ii) a primary edge device and a secondary edge device both coupled to the second access network, wherein the dynamic route comprises a shared virtual tunnel across a transport network from the origin device to both of the primary edge device and the secondary edge device; and
      in response to receiving a notification of failure of a first respective link from an affected one of the primary edge device or the secondary edge device, route a multicast transmission to the second access network by the unaffected one of the primary edge device or the secondary edge device, via a second respective link, independently of a multicast transmission designation;
      identify a second transmission as a unicast transmission having a recipient in the second access network;
      designate the unicast transmission, by the origin device, to correspond to either the primary edge device or the secondary edge device;
      subsequent to receiving the notification of failure of the first respective link at the unaffected one of the primary edge device or the secondary edge device, receive the unicast transmission from the affected one of the primary edge device or the secondary edge device, wherein the unaffected one of the primary edge device or the secondary edge device was not designated by the unicast transmission designation; and transmit the unicast transmission, by the unaffected one of the primary edge device or the secondary edge device, to the second access network via the second respective link.

10. The system of claim 9, wherein the control circuitry is further configured to:
configure a first static route between the primary edge device and the origin device, and a second static route between the secondary edge device and the origin device; and
configure the dynamic route using the first static route and the second static route.

11. The system of claim 10, wherein the primary edge device and the secondary edge device maintain a separate routing entry for each of the first static route, the second static route, and the dynamic route.

12. The system of claim 9, wherein the control circuitry is further configured to:
receive a second multicast transmission having a plurality of recipients in the second access network; and
designate the second multicast transmission, by the origin device, to correspond to the primary edge device or to the secondary edge device,
wherein the second multicast transmission is routed over the dynamic route to the second access network based on the second multicast transmission designation.

13. The system of claim 12, wherein the control circuitry is further configured to:
detect that the first respective link from either the primary edge device or the secondary edge device to the second access network is unavailable; and
forward a notification of failure of the first respective link to an unaffected one of the primary edge device or the secondary edge device whose second respective link to the second access network is still available.

14. The system of claim 9, wherein the control circuitry is further configured to determine that one of the primary edge device or the secondary edge device is down by the other one of the primary edge device or the secondary edge device by:
computing unavailability of a partner link between the primary edge device and the secondary edge device, the partner link for communication between the primary edge device and the secondary edge device serving the second access network; or
indexing a link state database indicative of switching device connectivity to determine unreachability of the primary edge device or the secondary edge device.

15. A non-transitory computer readable medium having instructions that, when executed by a processor, cause the processor to perform operations, the operations comprising:
maintaining connectivity between a first access network and a second access network over a dynamic route, using (i) an origin device coupled to the first access network and (ii) a primary edge device and a secondary edge device both coupled to the second access network, wherein the dynamic route comprises a shared virtual tunnel across a transport network from the origin device to both of the primary edge device and the secondary edge device;
in response to receiving the notification of failure of a first respective link from an affected one of the primary edge device or the secondary edge device, routing a multicast transmission to the second access network by an unaffected one of the primary edge device or the secondary edge device, via a second respective link, independently of a multicast transmission designation;
identifying a second transmission as a unicast transmission having a recipient in the second access network;
designating the unicast transmission, by the origin device, to correspond to either the primary edge device or the secondary edge device;
subsequent to the receiving the notification of failure of the first respective link at the unaffected one of the primary edge device or the secondary edge device, receiving the unicast transmission from the affected one of the primary edge device or the secondary edge device, wherein the unaffected one of the primary edge device or the secondary edge device was not designated by the unicast transmission designation; and
transmitting the unicast transmission, by the unaffected one of the primary edge device or the secondary edge device, to the second access network via the second respective link.

16. The non-transitory computer readable medium of claim 15, wherein the operations further comprise:
configuring a first static route between the primary edge device and the origin device, and a second static route between the secondary edge device and the origin device; and
configuring the dynamic route using the first static route and the second static route.

17. The non-transitory computer readable medium of claim 16, wherein the primary edge device and the secondary edge device maintain a separate routing entry for each of the first static route, the second static route, and the dynamic route.

18. The non-transitory computer readable medium of claim 15, wherein the operations further comprise:
receiving a second multicast transmission having a plurality of recipients in the second access network; and
designating the second multicast transmission, by the origin device, to correspond to the primary edge device or to the secondary edge device,
wherein the second multicast transmission is routed over the dynamic route to the second access network based on the second multicast transmission designation.

19. The non-transitory computer readable medium of claim 18, wherein the operations further comprise:
detecting that the first respective link from either the primary edge device or the secondary edge device to the second access network is unavailable; and
forwarding a notification of failure of the first respective link to an unaffected one of the primary edge device or the secondary edge device whose second respective link to the second access network is still available.

20. The non-transitory computer readable medium of claim 15, wherein the operations further comprise:
determining, by the unaffected one of the primary edge device or the secondary edge device, an availability of the first respective link that previously failed; and
releasing redirectional control of traffic for the affected one of the primary edge device or the secondary edge device.

* * * * *